W. Sellers,
Piano Lock.

Nº 42,994. Patented May 31, 1864.

Witnesses
Jas. L. Hall
Geo. W. Reed

Inventor
William Sellers

UNITED STATES PATENT OFFICE.

WILLIAM SELLERS, OF NEW YORK, N. Y., ASSIGNOR TO ANN RAMMAGE, OF THE CITY OF NEW YORK.

IMPROVEMENT IN FASTENINGS FOR DOORS, STAIR-RAILS, LASTS, &c.

Specification forming part of Letters Patent No. 42,991, dated May 31, 1864.

*To all whom it may concern:*

Be it known that I, WILLIAM SELLERS, of the city, county, and State of New York, have invented a new and Improved Lock or Fastening for Shoe-Lasts, Doors, Stair-Rails, &c.; and I do hereby declare that the following is a full, clear, and exact description of the same, reference being had to the accompanying drawings, making a part of this specification, in which—

Figure 1:
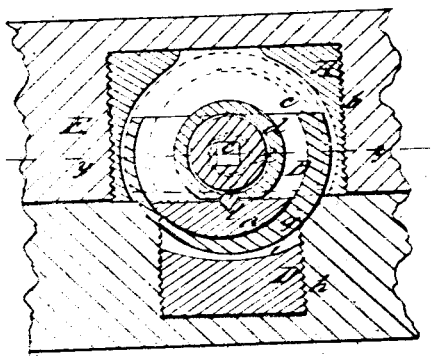
Figure 2:
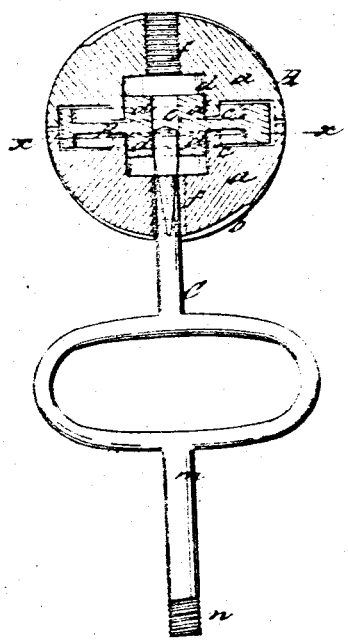
Figure 4:
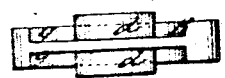

Figure 1 is a section of my invention taken in the line $x\,x$, Fig. 2; Fig. 2, a section of the same taken in the line $y\,y$, Fig. 1; Figs. 3, 4, 5, and 6, detached views of parts pertaining to the same.

Similar letters of reference indicate corresponding parts in the several figures.

This invention relates to a new and improved lock or fastening which may be used for doors and like purposes, for shoe-lasts, to secure the blocks thereto, or for connecting together the parts of stair-rails, &c.

The object of the invention is to obtain a simple lock or fastening which may be applied with very little trouble and form a very efficient fastening, especially for drawing and connecting parts snugly together.

To enable those skilled in the art to fully understand and construct my invention, I will proceed to describe it.

Figure 3:
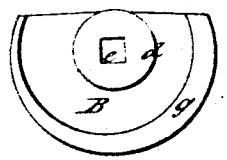

The portion A of the lock, which contains the bolt B, I construct of two longitudinal parts, $a\,a$, which are equal in dimensions and of semicylindrical shape, so that when their plane surfaces are abutted together they will form a cylinder. This portion A has a screw, $h$, cut on its exterior and the inner plane surfaces of the parts $a\,a$ have each a recess, $c$, made in them, in which the bolt B is fitted and allowed to work or turn freely, said bolt being of semicircular form or comprising rather more than a semicircle, as shown in Fig. 3. The bolt B is provided with a hub, $d$, at each side, said hubs being concentric with the circle of which the bolt B forms a part, and fitted in bearings $a$ in each part $a$ of the portion A of the bolt, as shown in Fig. 2. The hubs $d\,d$ have a square opening, $e$, made entirely through them, and the parts $a\,a$ have circular openings $f$ made in them in line with the openings $e$ to admit of a key, C, being fitted therein to turn the bolt B. The bolt B at each side at its periphery is provided with a flange, $g$. These flanges project from the bolt at right angles, and at their inner surfaces they are made of eccentric form, so as to constitute what may be termed a "semicircular wedge," as shown clearly in Fig. 3. The portion of the lock above described, consisting of the bolt B and the part A, in which the bolt works, is fitted in one of the two parts, to be connected or secured together by screwing the two parts $a\,a$ of A into an auger-hole made in one of the two parts to be connected together.

Figure 5:
Figure 6:
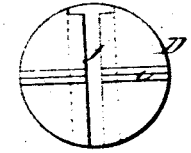

D represents the other portion of the lock which receives the bolt B. This portion D is constructed of a cylindrical piece of metal with a screw, $h$, cut on its exterior to screw into the other part of the two which are to be connected together, and it has a recess, $i$, made in its outer end to receive the bolt B, said recess having a narrow slot, $j$, extending from it to the end of D, as shown in Fig. 5, and having one side $a'$ of segmental form. When the bolt B is turned into the recess $i$, the inner surfaces of the flanges $g\,g$ of the bolt bear against the segmental side $a'$ of the recess $i$, and in consequence of the flanges $g$ being of taper form the two parts E E', in which A and D of the lock are respectively fitted, will be snugly drawn together.

In order to insure the ends of the two parts A D being brought properly in contact, I have the outer end of A cast or formed with a V-shaped cleat, $k$, extending across both parts $a\,a$ of A, and have a corresponding recess, $l$, made in the outer end of D to receive $k$, as will be fully understood by referring to Fig. 1, and in those cases where the part E, in which the portion A of the lock is fitted, requires to be removed when the lock is unlocked, as when A, for instance, is inserted in a last-block. I have internal screws cut in the opening $f$ in the parts $a\,a$ and have the key C, provided with a rod, $m$, on which a screw, $n$, is cut to screw into $f$, and thereby admit of E being readily withdrawn.

Having thus described my invention, what I claim as new, and desire to secure by Letters Patent, is—

1. The segment-bolt B, provided with taper or wedge shaped flanges $g\,g$, and fitted within the portion A of the lock, in connection with the portion D, provided with a recess, $i$, to receive the bolt, and having a segment-side, $a^2$, substantially as and for the purpose set forth.

2. Having the portion A constructed of two parts, $a\ a$, with a screw, $b$, cut on their exterior, to admit of the bolt B being readily adjusted in A, and also to admit of A being readily fitted in the part E, designed to receive it.

3. Fitting or securing the portion D of the lock in the part E' by means of the screw $h$ on its exterior, as set forth.

4. The cleat $k$ on the outer ends of the parts $a\ a$ of the portion A of the lock, in combination with the groove or recess $l$ in the outer end of the portion D, as and for the purpose specified.

WILLIAM SELLERS.

Witnesses:
JAMES P. HALL,
GEO. W. REED.